3,286,257
LOW FALSE ALARM RATE RADAR VIDEO PROCESSOR APPARATUS

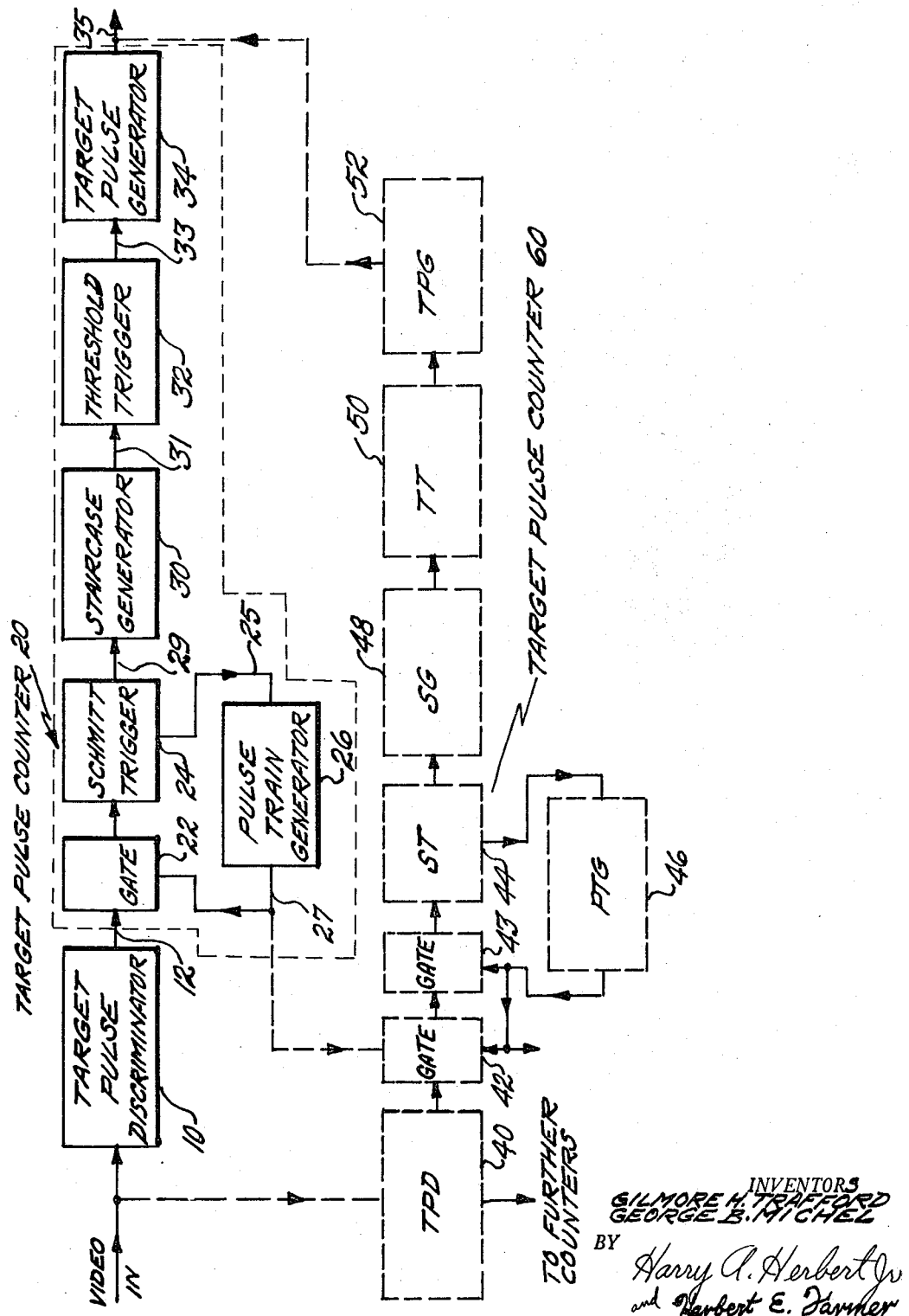

Gilmore H. Trafford, Lexington, Mass., and George B. Michel, Baltimore, Md., assignors, by mesne assignments, to the United States of America as represented by the Secretary of the Air Force
Filed Jan. 14, 1965, Ser. No. 425,648
3 Claims. (Cl. 343—17.1)

This invention relates to scanning radio object locating systems, and more particularly, to means for extracting target echo pulse information from a given radar in a manner that reduces the probability of false alarms. False alarms in radar systems are defined as any signals which provide any indication of a target which in fact is not a true target, which false indications are generally due to the noise in the system and to interference.

The instant low false alarm system has utility in unmanned radar installations in remote areas that are linked to control information centers. A problem basic to most radar equipment is the extraction of target information at low false alarm rates for further computer processing in a large system complex. The instant invention solves this information extraction problem by correlating the target information with a synthetic pulse train and eliminating extraneous information. The validity of the target information is determined by a threshold trigger circuit which is adjustable for any desired false alarm rate.

A principal object of this invention is to provide adjustable false alarm rate data to computer installations used for target tracking from any existing radar.

Other objects and features of the invention will become apparent from the following description taken in connection with the accompanying drawing which is a schematic block diagram of a preferred embodiment of the present invention.

Now referring to the drawing, video from the radar receiver (not shown) is fed into target pulse counter 20 via target pulse discriminator 10, which can be either a pulse width or pulse amplitude discriminator having sensitivity time control. The first pulse in the target echo pulse train appearing at output 12 of target pulse discriminator 10 passes through gate 22. Target pulse counter 20, which comprises gate 22, Schmitt trigger 24, staircase generator 30, threshold trigger 32, target pulse generator 34 and pulse generator 26, is designed to process information on only one target per radar antenna beamwidth; this is accomplished by the output from gate 22 which actuates Schmitt trigger 24 which in turn via lead 25 starts pulse train generator 26. Pulse train generator 26 generates a train of pulses 27 at the radar pulse repetition frequency; the pulses are equal in number to the total number of range sweeps per radar antenna beamwidth. Gate 22 with respect to train of pulses 27 acts as an inhibit gate which blocks any further output from gate 22 until the same range block is scanned during the next range sweep. The inhibiting process is continually repeated for the duration of pulse train 27. In this manner, one particular range block is repeatedly searched for the presence of a target pulse throughout the antenna beamwidth. Each time a target pulse appears within the range block, Schmitt trigger 24 via lead 29 causes staircase generator 30 to generate a voltage step. Thus, at the end of inhibiting pulse train 27 out of pulse train generator 26, the voltage level generated by staircase generator 30 is analogous to the number of target echoes received over the antenna beamwidth. Voltage level 31 is then fed into a data read-out device, which can be either a percentage blip scan indicator or, preferably, a threshold trigger (TT) digitalized pulse output. An output, 33, from threshold trigger 32 indicates that the number of target pulses received over the antenna beamwidth exceeded a predetermined minimum requirement. The level of threshold trigger 32 is adjusted to provide target false alarm rate 35 via lead 33 and target pulse generator 34 to meet the needs of the particular computer system being utilized. In this manner, any radar video data, regardless of false alarm rate, can be processed by the instant device to yield low false alarm rate data required by the computer.

The present radar video processor can be extended to process high false alarm rate data and to search more than one range block per antenna beamwidth by utilizing a plurality of target pulse counters (for example, a second target pulse counter 60 comprising gates 42 and 43, Schmitt trigger 44, staircase generator 48, threshold trigger 50, target pulse generator 52 and pulse train generator 46 is shown by the broken lines in the drawing). The actual number of target pulse counters required is dependent on the probability of the detection threshold being exceeded by either noise or target echoes within one antenna beamwidth. Because of the target pulse discriminator, the false alarm rate is considerably reduced, and it is this reduced figure which controls, to a great extent, the actual number of individual target pulse counters required for a low false alarm rate video processor.

As to the mode of operation of a number of target pulse counters operating in sequence, refer again to the single figure on the drawing. As soon as inhibiting pulse train generator 26 is fired in target pulse counter 20 by the occurrence of a detection threshold crossing in some range block, counter 20 becomes unresponsive to any further alarm until the same range block of the next range strobe is searched. Target pulse counter 60 receives video information in parallel with target pulse counter 20, but video information is blocked by gate 42 until such time as this gate is opened by the inhibit pulse from pulse train generator 26 of counter 20. Once this has occurred, video information at any other range is allowed to initiate Schmitt trigger (ST) 44 of counter 60 via gate 43. Further information through gate 43 will be inhibited by the action of pulse train generator (PTG) 46 of counter 60 until the same range block of the next range strobe is searched. Staircase generator 48, threshold trigger 50 and target pulse generator 52 operate in the same manner as previously described for pulse counter 20. Target pulse counter 20 will be the first to clear at the end of pulse train 27 of its pulse train generator 26. Each successive target pulse counter will clear in sequential order. This pattern of operation can be expanded to encompass any required number of target pulse counters.

Thus, the instant invention affords the advantage of providing low false alarm rate data to computer installations from any existing radar. The digital output characteristics of the threshold triggers can be used to alert a remote warning system.

While there has been shown what are at present considered to be preferred embodiments of the invention, it will be obvious that many changes and modifications may be made therein without departing from the essential scope of the invention. It is intended therefore in the accompanying claims to cover such changes and modifications as fall within the true spirit of the invention.

What we claim is:
1. In a scanning radar system comprising a receiver adapted to detect RF energy pulses reflected from a distant object, means for reducing false alarm data from one range block per antenna beamwidth comprising: pulse discriminator means connected to the output of said receiver, target pulse counter means connected to said pulse discriminator means and adapted to repeatedly search a predetermined range block throughout said antenna beamwidth to determine the presence of target pulses, voltage step generating means actuated by the output of said pulse counter means, said voltage step means generating a voltage level in proportion to the number of target pulse echoes received over said antenna beamwidth, and threshold trigger means connected to said voltage step generating means to generate an output to be fed to a utilization device when the number of said received target pulses exceeds a predetermined level.

2. The apparatus as described in claim 1 wherein said target pulse counter means comprises gating means, triggering means connected to said gating means, and means actuated by the output from said triggering means for generating a train of pulses at the radar pulse repetition frequency which are equal in number to the total number of range sweeps per radar antenna beamwidth, said train of pulses converting said gating means into inhibiting means for the duration of said train of pulses, and further includes target pulse generating means connected to the output of said threshold triggering means.

3. In a scanning radar system comprising a receiver adapted to detect RF energy pulses reflected from a distant target in space, means for reducing false alarm rate data, from a plurality of range blocks per antenna beamwidth comprising a plurality of pulse discriminators connected to the output of said receiver, a plurality of target pulse counters connected in parallel, one for each of said pulse discriminators, means included in each of said target pulse counters for generating an inhibiting train of pulses, additional gating means in all but the first of said plurality of pulse counters to prevent the activation of the next successive counter until said generated train of pulses is completed, a plurality of voltage step generating means, one for each of said target pulse counters for generating a voltage step each time a target pulse is detected, a plurality of threshold triggering means, one for each of said plurality of target pulse counters, and a plurality of target pulse generator means, one for each of said threshold triggering means, for passing low false alarm rate data to a utilization device.

No references cited.

CHESTER L. JUSTUS, *Primary Examiner.*
RODNEY D. BENNETT, *Examiner.*